United States Patent [19]

Nurmi et al.

[11] Patent Number: 5,116,397
[45] Date of Patent: May 26, 1992

[54] FIBRILLATION DEVICE FOR THE MANUFACTURE OF MINERAL WOOL

[75] Inventors: Tom Nurmi; Lasse Johansson; Mikael Fjäder, all of Pargas, Finland

[73] Assignee: Oy Partek AB, Pargas, Finland

[21] Appl. No.: 411,508

[22] PCT Filed: Apr. 5, 1988

[86] PCT No.: PCT/FI88/00050
§ 371 Date: Nov. 28, 1989
§ 102(e) Date: Nov. 28, 1989

[87] PCT Pub. No.: WO88/07980
PCT Pub. Date: Oct. 20, 1988

[30] Foreign Application Priority Data

Apr. 6, 1987 [FI] Finland .................... 871488

[51] Int. Cl.$^5$ .................................... C03B 37/05
[52] U.S. Cl. .................................... 65/14; 65/15
[58] Field of Search ................ 65/14, 6, 12, 15

[56] References Cited

U.S. PATENT DOCUMENTS 3,215,514  11/1965  Levecque .................... 65/6
3,785,791  1/1974   Perry ........................ 65/14
4,105,425  8/1978   Nielsen et al. ............. 65/14
4,433,992  2/1984   Debouzie et al. .......... 65/14 X
4,670,034  6/1987   Goodridge et al. ......... 65/14 X

FOREIGN PATENT DOCUMENTS 571807   3/1933  Fed. Rep. of Germany .......... 65/14
1728095  3/1960  France ........................ 64/14

Primary Examiner—Robert L. Lindsay
Attorney, Agent, or Firm—Cushman, Darby & Cushman

[57] ABSTRACT

In a fibrillation device for the manufacture of mineral wool, the mineral wool melt runs down onto the peripehral surface of a spinning wheel from which it is thrown to further spinning wheels. The melt is thrown out as fibres which are subjected to a strong blast of air. The stream of air is conducted through an air gap having oblique guide vanes in order to impart to the stream of fibres an axial and a tangential velocity component. The air gap is formed to impart to the stream of fibres a radial velocity component directed outwards in addition to the tangential velocity component in the direction of rotation. Therefore, the air stream meets the peripheral surface of the spinning wheel at an oblique angle and forms a conically shaped curtain around the peripheral surface of each spinning wheel.

7 Claims, 3 Drawing Sheets

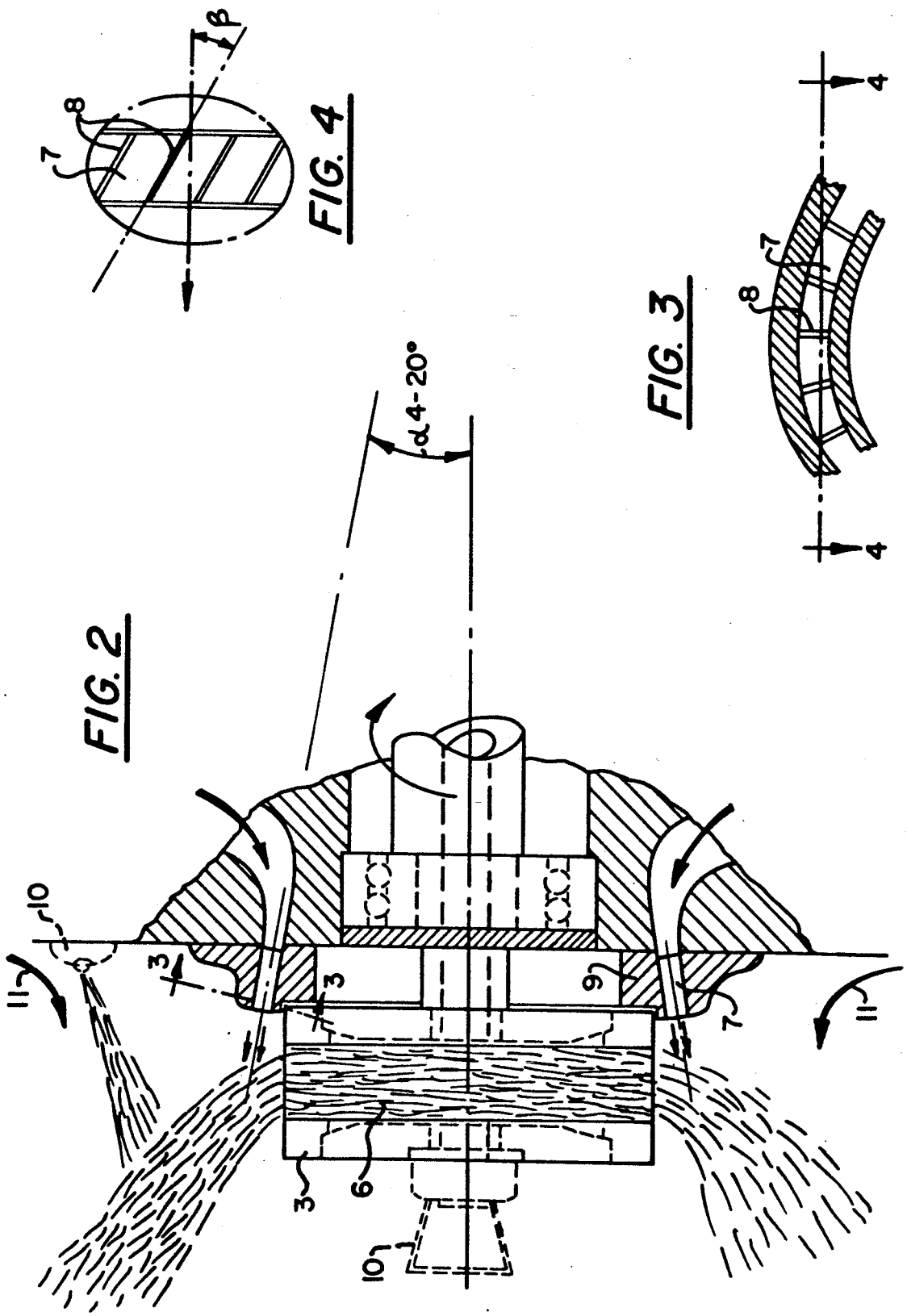

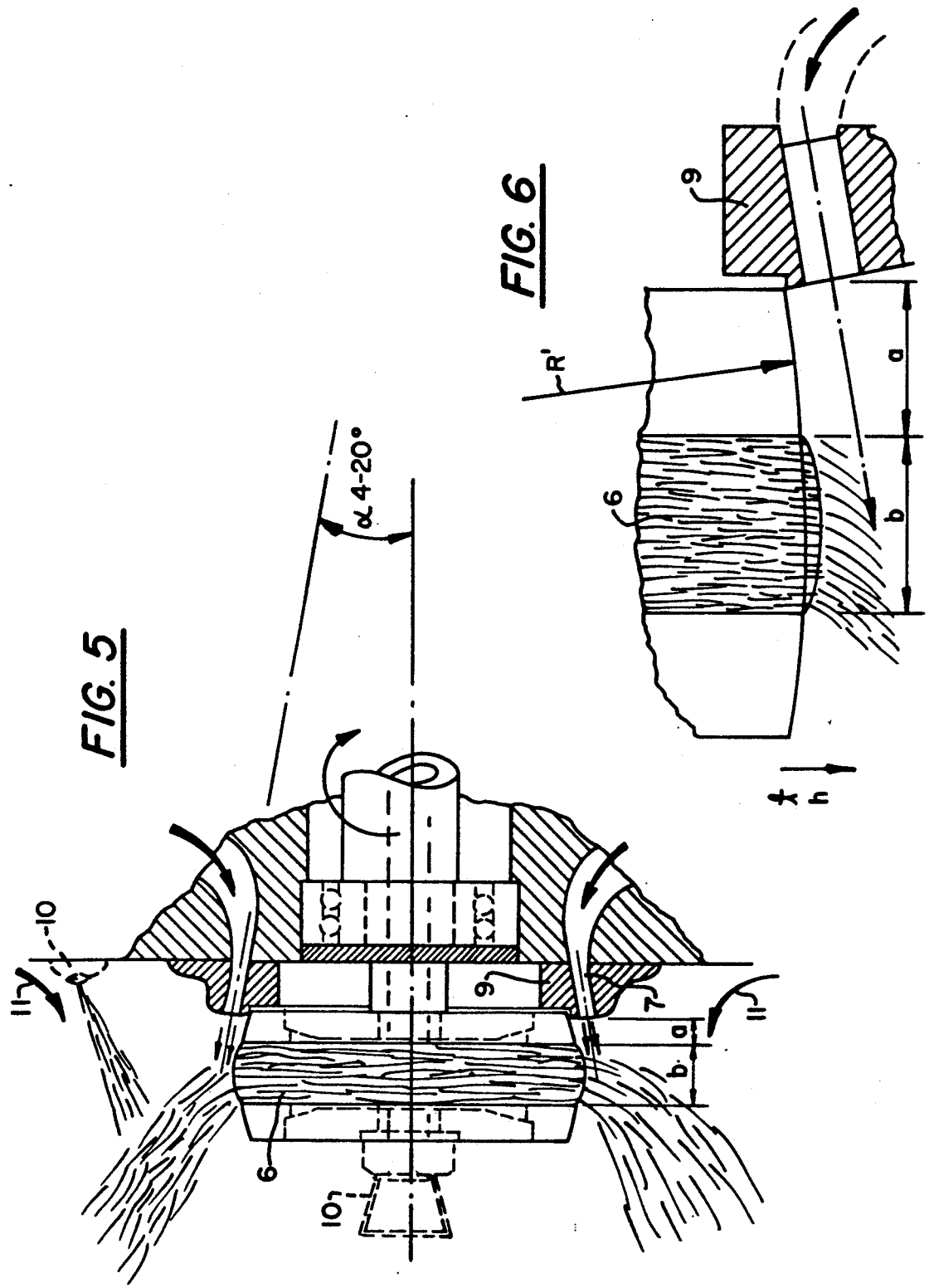

FIBRILLATION DEVICE FOR THE MANUFACTURE OF MINERAL WOOL

BACKGROUND OF THE INVENTION

The invention relates to a fibrillation device for the manufacture of mineral wool.

In the manufacture of mineral wool, a stream of molten oxide of suitable composition and viscosity is caused to run down onto one or more rapidly rotating spinning wheels which constitute a fibre-forming device. The stream of melt strikes the first spinning wheel or the narrow gap between the first pair of spinning wheels which rotate in opposite directions. The melt adheres to the peripheral surface and is thereafter, as a result of centrifugal force, thrown out from said surface in the form of fibres of melt. These fibres are cooled down and transported into the wool chamber and to the receiving conveyor with the aid of a stream of air which is blown in just outside the spinning wheel or spinning wheels and partly with the aid of air flowing around the fibrillation device. This air flow is produced by means of a partial vacuum maintained in the suction box under the receiving conveyor and in the wool chamber. The spinning wheels are usually four in number and they rotate preferably pairwise in opposite directions. The bulk of the melt is thrown out from the uppermost spinning wheel onto the following wheel where part of the melt is consumed in forming fibres and the remaining unfibrillated melt is transferred to the respective following wheel, until all the melt introduced has been fibrillated or has departed in the form of beads or slag. The unfibrillated waste beads fall down and are recovered.

The air stream is blown in through a slit which is concentric with the peripheral surface of the spinning wheel and located adjacent thereto along the outwardly facing peripheral surfaces. The air current cools the newly-formed fibres, to which a binder is then added from binder spray nozzles located in the centre of the spinning wheel and/or around the outside and behind the spinning wheels. The air currents transport the stream of fibres from the fibrillation device onto the receiving conveyor, which is perforated and on which the fibres form a thin mat.

Fibrillation devices of this kind are previously known from e.g., U.S. Pat. No. 3,785,791 and the British patent specifications GB 867,299 and 1,559,117.

According to the older British patent, the current of air is blown in through a slit which is located outside and concentric with the peripheral surfaces of the spinning wheels, parallel with the axes of rotation of the spinning wheels.

According to the more recent British patent the air stream which is introduced parallel to the axis is simultaneously given a tangential velocity component in the direction of rotation of the spinning wheel with the aid of inclined guide vanes in the air gap.

In the fibrillation stage, the melt adheres to the peripheral surface of the spinning wheel on which it forms a thin ring of melt which moves from the first spinning wheel to the next spinning wheel at the same time as melt is thrown out in the form of fibres from the respective spinning wheels. The air stream, which has as its purpose to cool the fibres before they encounter the binder and to transport the fibres from the fibrillation zone to the receiving conveyor, meets the newly-formed fibres in a direction which is parallel to the axis of rotation of the spinning wheel but inclined in the direction of rotation as a consequence of the inclined guide vanes in the air gap.

In the fibrillation stage a large part of the fibres is broken as a result of the blowing. It is assumed that at a certain temperature the fibres are extremely brittle and break easily.

Another drawback in connection with fibrillation according to the known processes is that blowing with unheated air causes a cooling down of the ring of melt adhering to the spinning wheel. This has an adverse affect on fibre formation. In addition, the air stream, which besides impinging on the newly-formed fibres also impinges on the melt ring located immediately below, causes a displacement and deformation of the melt ring on the peripheral surface of the spinning wheel, as a consequence of which the fibre-forming situation is more difficult to control.

SUMMARY OF THE INVENTION

The purpose of the present invention is to improve the conditions of fibre formation so that the air stream principally meets the ready-formed fibres above the melt ring and thereby leaves the melt ring unaffected as regards cooling, deformation and lateral displacement.

The air gap around the spinning wheels is arranged so as to impart to the air stream a velocity component which is directed radially outwards in relation to the axis of the spinning wheel so that the air stream forms a conically-shaped curtain around the spinning wheels with the vertex of the cone located in front of the spinning wheels, as seen in the direction of flow.

According to an advantageous embodiment of the fibrillation device, the radially outwards directed velocity components form an angle of 4°-20° to the respective axis of rotation The air gap, according to an advantageous embodiment, is formed in a fixed collar which concentrically surrounds the peripheral surfaces of the spinning wheels at which the blow-off of fibres shall take place, and the walls of the air gap in the collar are parallel to each other and form the desired angle between 4° and 20° with the axes of rotation.

The air stream is thereby caused to leave the air gap in the form of a conical ring around the peripheral surfaces of the spinning wheels, and with the air stream directed in the direction of rotation as a result of the tangential velocity component which is created by fixed inclined guide vanes in the air gap. This results in considerably more gentle handling of the newly-formed fibres, since the direction of the air stream mainly coincides with the direction in which the fibres are thrown out.

The frictional forces between the stream of air which is blown in and the mass of air which surrounds the spinning wheels and which, as a consequence of the rotation of the wheels, rotates with the spinning wheels, are less than in the previously known processes and thereby have a less unfavourable effect on the brittle newly-formed fibres.

The melt ring is considerably less affected by the air stream since the latter is directed obliquely across the melt ring. This means that the melt ring is not cooled down, deformed or displaced by the air stream.

The conically-shaped air blast also contributes to a better distribution of the stream of fibres in the wool chamber. Further, it can be mentioned that the fibre mat formed is of better quality since it contains, on average longer fibres as a result of the lower breakage frequency and fewer beads as a result of the reduced cooling of the melt ring and the more favourable flow conditions in the fibrillation, which from the point of view of process technology also means improved conversion of the melt input.

In order further to improve the conditions of fibre formation, in an advantageous embodiment of the invention, the peripheral surface of the spinning wheel is crowned. The crowning is very slight and can be formed so that the middle region of the peripheral surface is planar, while the side surfaces slope upwards. The position of the crowning on the peripheral surface can vary and its shape and position can be different on the different spinning wheels.

Crowning causes the melt ring to be centred on the peripheral surface and to take up a fixed position on the surface. This means that the position of the stream of fibres formed above the spinning wheel can be precisely determined and the air stream arranged to meet the stream of fibres at the right height. With a plane peripheral surface the melt ring has a tendency to move on the peripheral surface to a certain extent even though the air stream does not impinge on the melt ring. By shifting the highest point of the crowning on the peripheral surface to one side or the other the melt ring and with it the stream of fibres formed can be shifted to the desired position in relation to the air stream.

Crowning also gives the advantage that the melt need not meet the receiving spinning wheel exactly in the middle, since the melt ring will be centred as a result of the crowning.

BRIEF DESCRIPTION OF THE DRAWINGS

In following the invention will be described in greater detail in the form of examples of a few advantageous embodiments and with reference to the accompanying figures, in which:

FIG. 2 shows a vertical cross-section along the line 2—2 in FIG. 1, on a larger scale;

FIG. 3 shows a partial cross-section through the air gap taken along the line 3—3 in FIG. 2;

FIG. 4 shows a cross-section through the air gap along the line 4—4 in FIG. 3;

FIG. 5 shows a vertical cross-section equivalent to FIG. 2 but with a crowned spinning wheel; and FIG. 6 shows the region circles by a chain-dot line in FIG. 5 on a larger scale.

DETAILED DESCRIPTION

Figure 1:
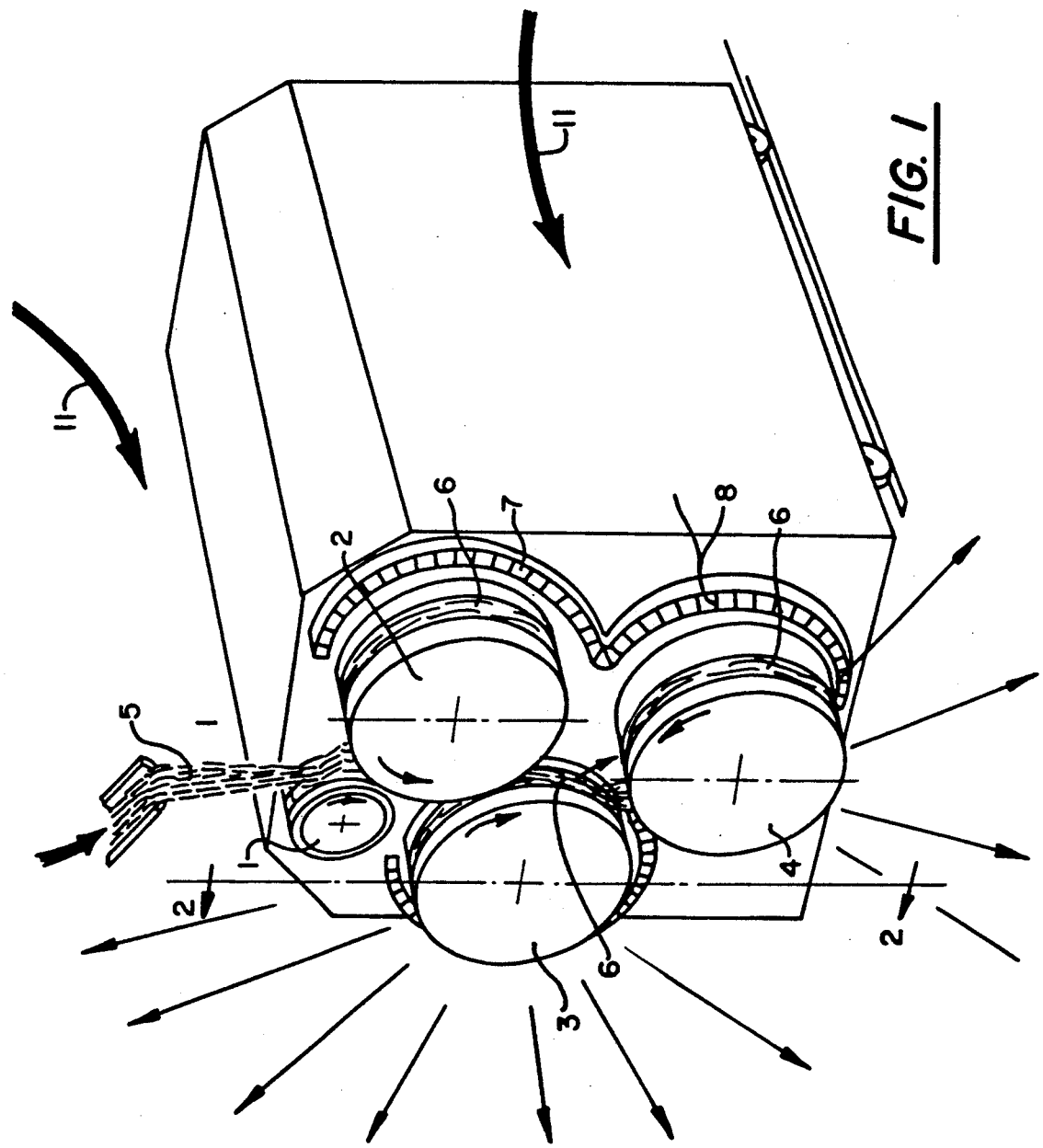
FIG. 1 shows the fibrillation device of the invention in a perspective view.

In the figures, the corresponding parts have been denoted by the same reference numbers. The spinning wheels have been denoted by the numbers 1, 2, 3 and 4, of which the spinning wheel 1 is the receiving wheel and, as a rule in fibrillation devices with four spinning wheels, is without blow-off. The melt running down has been denoted by 5 and the melt ring on the various spinning wheels by 6. The air gap has been denoted by 7 and the inclined guide vanes in the air gap by 8. The collar with the air gap 7 has been denoted by 9 and the binder spray nozzles by 10. The number 11 denotes the air which as a result of the partial vacuum in the wool chamber flows in around the fibrillation device and transports the fibres to the collecting conveyor.

FIG. 1 shows a fibrillation device according to the invention, but can equally well represent a fibrillation device according to known technology, since the air gap which constitutes the novelty of the invention is not apparent in detail from FIG. 1. The figure shows the main features of the fibrillation process.

The melt 5 comes running down onto the peripheral surface of spinning wheel 1 and is transferred from there to spinning wheel 2, from which the melt is transferred to wheel 3 and further to wheel 4. After having adhered to the peripheral surface and been accelerated sufficiently, the melt is thrown out in the form of fibres as a result of centrifugal force. The fibres are thrown radially outwards and are met there by the air stream which is blown in through the air gap 7 and between the guide vanes 8, and later also by the air 11 which flows in around the fibrillation device.

The manner in which the stream of fibres is affected by the stream of air blown in through the air gap 7 is apparent in more detail from FIG. 2. The stream of air has a radial velocity component directed outwards at an angle $\alpha$ to the axis of rotation and a tangential velocity component in the direction of rotation the magnitude of which is determined by the angle $\beta$ of the guide vanes 8. The angle $\alpha$ can be approx. 4°-20°, advantageously approx. 5°-10°. The blow-off air forms a conically-shaped curtain around the spinning wheel with the vertex of the cone in front of the spinning wheel. Through the effect of the tangential velocity component, the air stream is twisted skew in the direction of rotation and promotes the transport of the fibres from the peripheral surface of the spinning wheel. The figure shows the resulting stream of fibres in the direction of the wool chamber. In the figure two binder spray nozzles 10 have been drawn; one in front of the spinning wheel and mounted on the front wall construction of the fibrillation device, and one in the centre of the spinning wheel 3.

FIGS. 3 and 4 show two different cross-sections through the air gap, from which can be seen the inclined arrangement of the guide vanes 8 at an angle $\beta$.

FIG. 5 shows the same cross-section of the fibrillation device as in FIG. 2, but with the difference that the peripheral surface of the spinning wheel is crowned. In FIG. 6, the region that is encircled by a chain-dot line in FIG. 5 is shown on a larger scale. Through the effect of the centrifugal force, the melt ring 6 is centred to the outermost position on the peripheral surface. The width of the melt ring is marked by b. As a result of the centring effect the melt ring will lie at a distance of a from the air gap 7. The centre line of the air stream will lie at a distance of h from the mid-point of the melt ring, which is at a distance of t from the peripheral surface. If it is desired to regulate the distance h this can be done by displacing the mid-point of the crowning in the desired direction. If the distance h is to be smaller, the melt ring should be centred nearer the air gap, and if the distance h is to be larger, the melt ring should be centred further from the air gap. The distance h can clearly also be regulated by means of regulating the diameter of the spinning wheel.

The crowning has been somewhat exaggerated in the figures. In reality, the difference between the diameter measurements $d_{min}$ and $d_{max}$ is of the order of magnitude of 1-3%.

The position of the crowning on the spinning wheels can vary from spinning wheel to spinning wheel with a view to more efficient utilization of the fibrillation zone in the axial direction so that the streams of fibres from the different spinning wheels do not intersect each other but are, instead, axially displaced with respect to each other.

We claim:

1. A fibrillation device for the manufacture of mineral wool, comprising:
    at least one rapidly rotating spinning wheel having an outer peripheral surface; means for directing a fluid melt to run down onto said outer peripheral surface; and a fixedly attached gap arranged around each said spinning wheel, concentric with and adjacent to each said spinning wheel means for introducing through said gap a stream of air for cooling and transporting molten mineral fibre material thrown out from the outer peripheral surface of each said spinning wheel mainly int he direction of the axes of rotation of each said spinning wheel; said air gap being arranged so as to impart to the air stream a tangential component of motion in the direction of rotation of the respective said spinning wheel said air gap being so arranged, by being inclined in relation to the axis of rotation of the respective spinning wheel, as to impart to said air stream another velocity component which is directed radially outwards in relation to the axis of rotation of the respective spinning wheel so that said air stream forms a conically shaped curtain around the respective spinning wheel with the vertex of the cone located in front of the respective spinning wheels as seen in the direction of flow.

2. A fibrillation device according to claim 1, wherein: said air gap forms an angle of 4°-20° with the axis of rotation of the respective spinning wheel.

3. A fibrillation device according to claim 2, wherein: said air gap is formed in a fixed collar which concentrically surrounds each spinning wheel from the respective peripheral surface of which fibre blow-off takes place; and the air gap is defined by walls in the collar which are parallel to each other and form said angle with the axis of rotation of the respective spinning wheel.

4. A fibrillation device according to claim 1, wherein: at least one said spinning wheel is crowned.

5. A fibrillation device according to claim 4, wherein: on each said crowned wheel, the crowning extends between opposite edges of the peripheral surface of the respective crowned wheel throughout a distance that is less than the width of the respective said peripheral surface.

6. A fibrillation device according to claim 4, wherein: said at least one spinning wheel comprises a plurality of said spinning wheels, a plurality of ones of which are crowned, and the shape of the crowning of each crowned spinning wheel and its position on the outer peripheral surface of each crowned spinning wheel is different from one another on at least two of the crowned spinning wheels.

7. A fibrillation device according to claim 1, wherein: said air gap forms an angle of 5°-10° with the axis of rotation of the respective spinning wheel.

* * * * *